United States Patent [19]

Moon et al.

[11] Patent Number: 4,460,308
[45] Date of Patent: Jul. 17, 1984

[54] METHOD FOR LOADING COAL INTO RAILROAD CARS

[75] Inventors: Jack L. Moon; John C. Tompkins, both of Oklahoma City, Okla.

[73] Assignee: Kerr-McGee Coal Corporation, Oklahoma City, Okla.

[21] Appl. No.: 346,961

[22] Filed: Feb. 8, 1982

[51] Int. Cl.³ .............................................. B65G 67/22
[52] U.S. Cl. ........................................ 414/786; 141/1; 141/9; 141/83; 414/21; 414/329
[58] Field of Search ................. 414/21, 328, 329, 786; 141/1, 9, 83, 98, 231–233

[56] References Cited

FOREIGN PATENT DOCUMENTS 0698885 12/1979 U.S.S.R. .............................. 414/328
0709487 1/1980 U.S.S.R. .............................. 414/329

Primary Examiner—Robert G. Sheridan
Attorney, Agent, or Firm—William G. Addison

[57] ABSTRACT

A system for loading coal or other particles into railroad cars wherein every other railroad car is designated an EVEN railroad car and the remaining every other railroad cars are designated ODD railroad cars. Each EVEN railroad car is weighed after being filled with coal and before the initiation of the loading of coal into the next EVEN railroad car to determine a filled weight. The filled weight of each EVEN railroad car is compared to a predetermined control weight and, in response to this determination, the termination of the loading of coal into the next EVEN railroad car controllably is varied to bring the filled weight closer to control weight. In a like manner, each ODD railroad car is weighed after being filled with coal and before the initiation of the loading of coal into the next ODD railroad car to determine a filled weight. The filled weight of each ODD railroad car is compared to the predetermined control weight and, in response to this determination, the termination of the loading of coal into the next ODD railroad car controllably is varied to bring the filled weight closer to the control weight.

27 Claims, 7 Drawing Figures

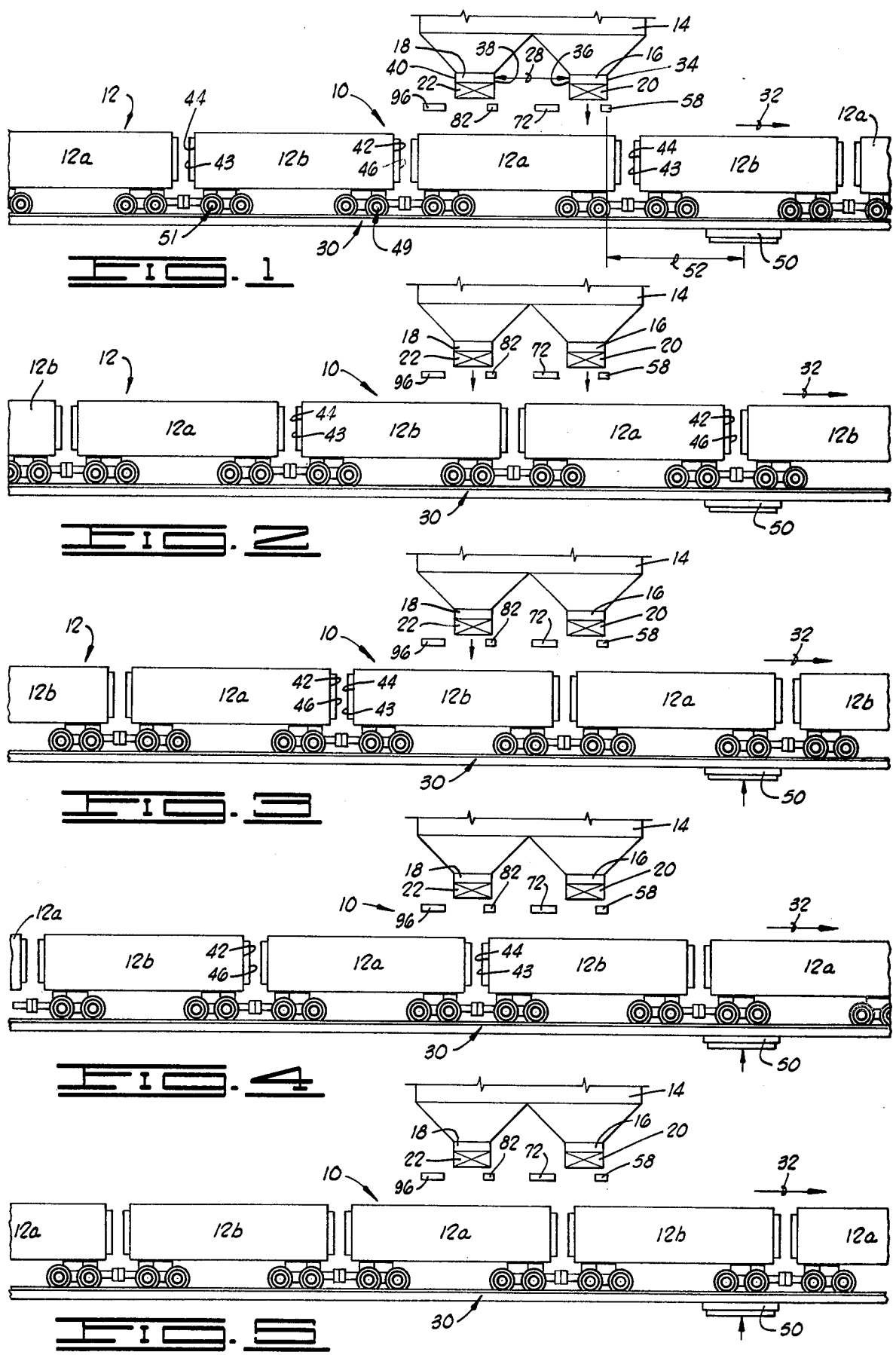

METHOD FOR LOADING COAL INTO RAILROAD CARS

BACKGROUND OF THE INVENTION

1. Field of the Invention

The present system generally relates to loading coal into railroad cars and, more particularly, but not by way of limitation, to a system for loading coal in railroad cars so the filled weight of the railroad cars is closer to a predetermined control weight.

2. Brief Description of the Prior Art

The DeBeer U.S. Pat. No. 3,797,682 disclosed a system for loading coal into railroad cars where the point of discharge of the particulate material was moved in a controlled manner.

The Miller, at al. U.S. Pat. No. 2,788,134 disclosed an automatic loading system for the uniform loading of railroad cars which utilized a conveyor arrangement.

The Fath, et al. U.S. Pat. No. 2,962,172 disclosed a system for automatically loading a predetermined quantity of particulate material into hoppers from storage bins and subsequently discharging such material.

The Morawski, et al. U.S. Pat. No. 3,235,104 disclosed a system for loading particulate material into freight cars from an overhead hopper which provided visually perceivable signals to the operator of the locomotive.

The Giesking U.S. Pat. No. 3,251,487 disclosed a system for loading particulate material into railroad cars which utilized a plurality of discharge chutes, each with an automatic cut-off so that only a predetermined weight of material was loaded into each car.

The Parsons U.S. Pat. No. 3,964,620 disclosed a system for loading material into vehicles which provided visually perceivable signals for alerting the driver of the vehicle position with respect to the loading station and which included means for sensing the level of the material loaded into the vehicle.

The Kelvie U.S. Pat. No. 1,895,077 disclosed a system for loading material into skip tubs used for loading blast furnaces.

The Winship, et al. U.S. Pat. No. 2,288,763 disclosed an automatic system for loading cars in a progressive manner wherein the cars were advanced automatically in response to the height of the material loaded into such cars.

The McCarthy U.S. Pat. No. 2,659,498 disclosed an automatic loading station for loading a plurality of mine cars with coal which included a system responsive to the height of the coal loaded into such cars.

BRIEF DESCRIPTION OF THE DRAWINGS

FIG. 1 is a diagrammatic, schematic view of the system of the present invention for loading coal into railroad cars, showing the railroad cars in one position with respect to two chutes.

FIG. 2 is a view similar to FIG. 1, but showing the railroad cars in a different position with respect to the two chutes.

FIG. 3 is a view similar to FIGS. 1 and 2, but showing the railroad cars in another position.

FIG. 4 is a view similar to FIGS. 1, 2 and 3, but showing the railroad cars in yet another position.

FIG. 5 is a view similar to FIGS. 1, 2, 3 and 4, but showing the railroad cars in still another position.

BRIEF DESCRIPTION OF THE PREFERRED EMBODIMENT

Figure 6:
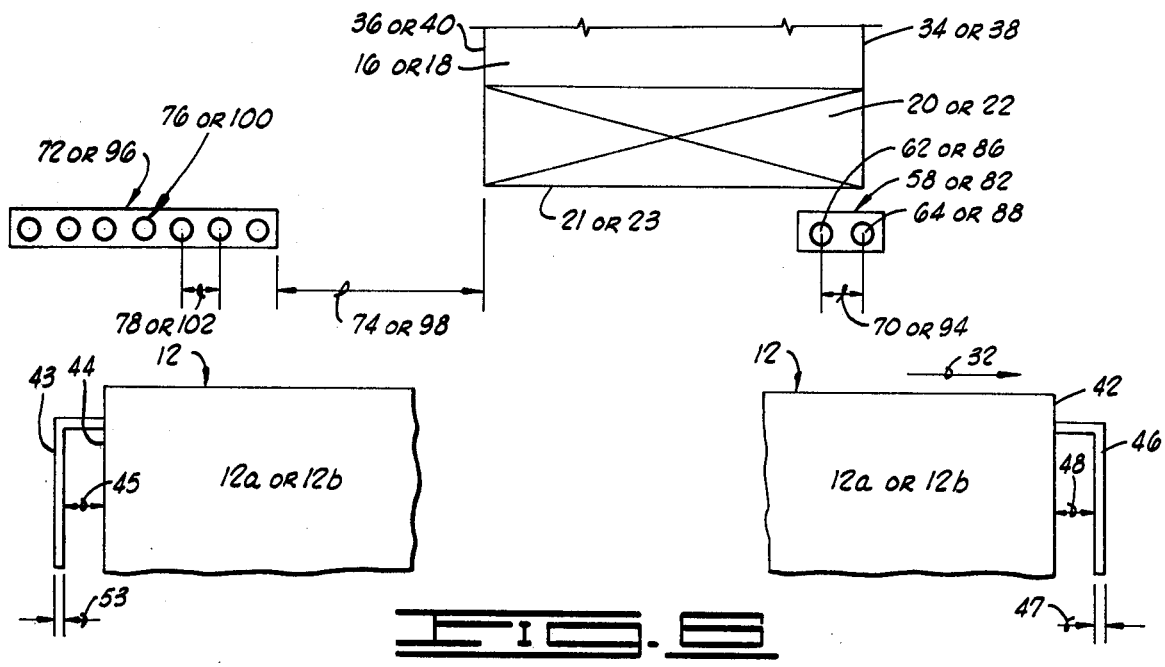
FIG. 6 is an enlarged diagrammatic view showing a portion of a typical first or second chute with typical leading edge and trailing edge sensor assemblies, a fragmented view of a typical railroad car being shown in FIG. 6.

Referring to the drawings in general and to FIG. 1 in particular, shown therein and designated by the general reference numeral 10 is a system for loading coal or other particles into railroad cars 12. The coal is stored in a silo 14 (partially shown in FIG. 1) and the coal is dischargable from the silo 14 through a first chute 16 or a second chute 18.

A first gate 20 is disposed in the first chute 16. The first gate 20 has an opened position and a closed position. Coal stored in the silo 14 is dischargeable through a discharge end 21 (the reference numeral 21 being shown only in FIG. 6) of the first chute 16 in the opened position of the first gate 20 and, in the closed position of the first gate 20, the first gate 20 blocks the first chute 16 and prevents coal from being discharged through the first chute 16.

A second gate 22 is disposed in the second chute 18. The second gate 22 has an opened position and a closed position. Coal stored in the silo 14 is dischargeable through a discharge end 23 (the reference numeral 23 being shown only in FIG. 6) of the second chute 18 in the opened position of the second gate 22 and, in the closed position of the second gate 22, the second gate 22 blocks the second chute 18 and prevents coal from being discharged through the second chute 18.

Figure 7:
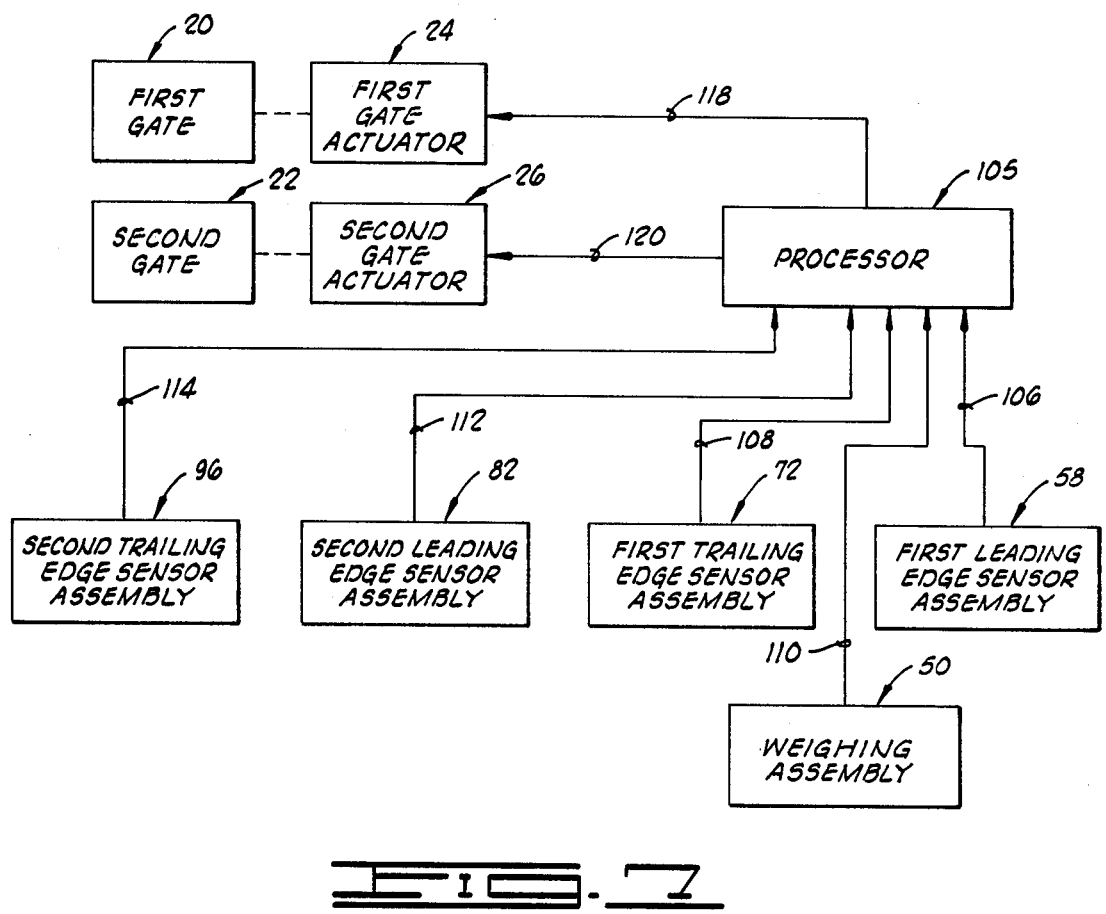
FIG. 7 is a schematic, diagrammatic view showing the control assembly of the system of the present invention for controlling the loading of coal into railroad cars.

As shown in FIG. 7, a first gate actuator 24 is mechanically connected to the first gate 20. The first gate actuator 24 is adapted to move the first gate 20 to the opened position in response to receiving an open signal and to move the first gate 20 to the closed position in response to receiving a close signal.

As shown in FIG. 7, a second gate actuator 26 is mechanically connected to the second gate 22. The second gate actuator 26 is adapted to move the second gate 22 to the opened position in response to receiving an open signal and to move the second gate 22 to the closed position in response to receiving a close signal.

The silo 14 is supported from the ground by structures well known in the art, but not shown in the drawings, so that the discharge ends 21 and 23 of the first and second chutes 16 and 18, respectively, are supported a predetermined distance above the ground. As shown in FIG. 1, the first and the second chutes 16 and 18 are spaced apart a distance 28 and both chutes 16 and 18 are in communication with and are capable of discharging coal from the same silo 14.

In some applications, the first chute 16 may be associated with one silo and the second chute 18 may be associated with a different silo. In any event, silos for storing coal or other particles having chutes for discharging such coal or particles are well known in the art. Further, it is well known in the art to dispose gates, such as the gates 20 and 22, in the chutes for controlling the discharge of coal or particles from the silos and to include controls, such as the gate actuators 24 and 26, for opening and closing such gates. Thus, it is not deemed necessary to describe the details of the construction and operation of particular silos or gates or gate actuators.

The silo 14, more particularly, is constructed and supported so that the discharge ends 21 and 23 of the chutes 16 and 18 are supported a predetermined distance above a railroad track 30, which is sufficient to permit a train engine (not shown) pulling the railroad cars 12 to pass under the discharge ends 21 and 23 of the chutes 16 and 18 as the railroad cars 12 are pulled or moved in a direction of travel 32. More particularly, the chutes 16 and 18 are supported such that the discharge ends 21 and 23 are above the upper end portions of the railroad cars 12 as the railroad cars 12 are pulled or moved in the direction of travel 32.

As shown in FIGS. 1 and 6, the first chute 16 has a leading edge 34 and a trailing edge 36. The second chute 18 has a leading edge 38 and a trailing edge 40.

A known maximum weight of a railroad car filled with coal generally is established, this maximum weight being referred to herein as the "predetermined control weight". If railroad cars are filled to an extent that the filled weight (the weight of the railroad car and the coal loaded therein), exceeds the predetermined control weight, this could have various undesirable affects on the companies responsible for filling such overweight railroad cars. On the other hand, if the filled weight of the railroad cars is substantially less than the predetermined control weight, revenues are reduced and the coal purchasers' costs are increased since less coal is shipped per unit train (a train consisting of a fixed number of railroad cars). In addition, shipments can be delayed for the purpose of removing coal from overweight railroad cars which also results in an expense. The foregoing represent some of the reasons it is desirable to fill each railroad car with an amount of coal so that the filled weight of each railroad car is as close as possible to the control weight without exceeding the control weight. The system 10 of the present invention provides a method for loading coal into railroad cars 12 so the filled weight of each of the railroad cars 12 more closely approximates the control weight without exceeding the control weight.

Utilizing the system 10, every other railroad car 12 is designated by a first designation or identification and the remaining every other railroad cars 12 are designated by a second designation or identification. For the purpose of illustrating the system 10, every other railroad car 12 has been designated by the first designation "EVEN" and identified in the drawings by the reference numeral 12a. The remaining railroad cars 12 have been designated by the second designation "ODD" and identified in the drawings by the reference numeral 12b.

Also, utilizing the system 10, one of the chutes 16 or 18 is designated to fill the EVEN railroad cars 12a with coal and the other chute 16 or 18 is designated to fill the ODD ralroad cars 12b with coal. In the illustration of the system 10 as described herein, the first chute 16 is designated to fill the EVEN railroad cars 12a and the second chute 18 is designated to fill the ODD railroad cars 12b.

Each of the railroad cars 12 is constructed in a conventional manner and each has a leading end 42 and a trailing end 44. A front ladder 46 is connected to the leading end 42 of each railroad car 12 and each front ladder 46 is spaced a distance 48 from the leading end 42, the front ladder 46 having a ladder width 47. A rear ladder 43 is connected to the trailing end 44 of each railroad car 12 and each rear ladder 43 is spaced a distance 45 from the trailing end 44, the rear ladder 43 having a ladder width 53.

Each of the railroad cars 12 is rollingly supported on the railroad track 30 by a front wheel assembly 49 and a rear wheel assembly 51. The leading end 42, the trailing end 44, the ladders 46 and 43, the front wheel assembly 49 and the rear wheel assembly 51, are designated in FIG. 1 with respect only to one of the railroad cars 12 and the distances 48, 47, and 53 are shown only in FIG. 6.

A weighing assembly 50 is disposed beneath the railroad track 30 and is positioned a distance 52 (shown only in FIG. 1) in the direction of travel 32 from the leading edge 34 of the first chute 16. The weighing assembly 50 is of the commercially available type generally referred to in the art as an in-motion track scale and is constructed and positioned beneath the railroad track 30 to weigh a railroad car 12 positioned on the railroad track 30 above the weighing assembly 50 while the railroad car 12 is moving in the direction of travel 32. In addition, the weighing assembly 50 is constructed and adapted to provide an output signal which is indicative of the weight of the railroad car 12 weighed by the first weighing assembly 50.

A first leading edge sensor assembly 58 is disposed near the first chute 16. The first leading edge sensor assembly 58 is spaced a distance in the direction of travel 32 from the leading edge 34 of the first chute 16 and the first leading edge sensor assembly 58 also is positioned to detect or sense the leading end 42 of the railroad cars 12 passing under the first chute 16. As shown in FIG. 6, the first leading edge sensor assembly 58 is spaced a distance equal to zero; however, in some applications it may be desirable to make this distance something other than zero.

As shown in FIG. 6, the first leading edge sensor assembly 58 comprises a first and a second photocell 62 and 64. The first and the second photocells 62 and 64 are spaced apart a distance 70 which is slightly greater than the ladder widths 47 or 53 plus the respective distances 48 or 45. The first photocell 62 is positioned to sense the leading end 42 of a railroad car 12 at a first predetermined position with respect to the first chute 16 and the second photocell 64 is positioned to sense the leading end 42 of a railroad car 12 at a second predetermined position with respect to the first chute 16.

The photocells 62 and 64 are positioned on one side of the railroad track 30 and a pair of light sources (not shown) are positioned on the opposite side of the railroad track 30 such that the railroad cars 12 pass between the photocells 62 and 64 and the light sources (not shown), as the railroad cars 12 travel along the railroad track 30. More particularly, one of the light sources (not shown) is aligned with the first photocell 62 and the other light source (not shown) is aligned with the second photocell 64. The photocells 62 and 64 each are constructed and adapted to detect or sense light received from the respective light source (not shown) and each photocell 62 and 64 provides an output signal in response to an interruption of the light provided by the respective light source (not shown), the output signals sometimes being referred to herein as a first and a second signal, respectively, and the photocells 62 and 64 sometimes being referred to herein as a first and second signal source, respectively. It also should be noted that laser beams and laser beam sensors could be used in lieu of the photocells and light sources, if desired in a particular application. Photocells and light sources of the type just described with respect to the photocells 62 and 64 are commercially available and a detailed description of the construction and the operation is not deemed necessary.

A first trailing edge sensor assembly 72 is disposed near the first chute 16. The first trailing edge sensor assembly 72 is spaced a distance 74 (shown only in FIG. 6) in the direction opposite the direction of travel 32 from the trailing edge 36 of the first chute 16 and the first trailing edge sensor assembly 72 also is positioned to detect or sense the trailing end 44 of the railroad cars 12 passing under the first chute 16.

As shown in FIG. 6, the first trailing edge sensor assembly 72 comprises a plurality of spaced apart photocells 76, seven photocells being shown in FIG. 6. The photocells 76 are spaced apart a distance 78 (only one of the distances 78 being designated by a reference numeral in FIG. 6). The photocells 76 are positioned to sense the trailing end 44 of a railroad car 12 at predetermined spaced apart positions.

The photocells 76 are positioned on one side of the railroad track 30 and light sources (not shown) are positioned on the opposite side of the railroad track 30 such that the railroad cars 12 pass between the photocells 76 and the light sources (not shown), as the railroad cars 12 travel along the railroad track 30. More particularly, each of the light sources (not shown) is aligned with one of the photocells 72. The photocells 72 each are constructed and adapted to detect or sense light received from the respective one of the light sources (not shown) and each photocell 72 provides an output signal in response to an interruption of the light provided by the respective light source (not shown), the photocells 76 sometimes being referred to herein as signal sources. It also should be noted that laser beams and laser beam sensors could be used in lieu of the photocells and light sources, if desired in a particular application. Photocells and light sources of the type just described with respect to the photocells 72 are commercially available and a detailed description of the construction and the operation is not deemed necessary.

A second leading edge sensor assembly 82 is disposed near the second chute 18. The second leading edge sensor assembly 82 is spaced a distance in the direction of travel 32 from the leading edge 38 of the second chute 18 and the second leading edge sensor assembly 82 also is positioned to detect or sense the leading end 42 of the railroad cars 12 passing under the second chute 18. As shown in FIG. 6, the second leading edge sensor assembly 82 is spaced a distance equal to zero; however, in some applications it may be desirable to make this distance something other than zero.

As shown in FIG. 6, the second leading edge sensor assembly 82 comprises a first and a second photocell 86 and 88. The first and the second photocells 86 and 88 are spaced apart a distance 94 which is slightly greater than the ladder widths 47 or 53 plus the respective distances 48 or 45. The first photocell 86 is positioned to sense the leading end 42 of a railroad car 12 at a first predetermined position with respect to the second chute 18 and the second photocell 88 is positioned to sense the leading end 42 of a railroad car 12 at a second predetermined position with respect to the second chute 18.

The photocells 86 and 88 are positioned on one side of the railroad track 30 and a pair of light sources (not shown) are positioned on the opposite side of the railroad track 30 such that the railroad cars 12 pass between the photocells 86 and 88 and the light sources (not shown) as the railroad cars 12 travel along the railroad track 30. More particularly, one of the light sources (not shown) is aligned with the first photocell 86 and the other light source (not shown) is aligned with the second photocell 88. The photocells 86 and 88 each are constructed to detect or sense light received from the respective light source (not shown) and each photocell 86 and 88 provides an output signal in response to an interruption of the light provided by the respective light source (not shown), the output signals sometimes being referred to herein as a first and a second signal, respectively, and the photocells 86 and 88 sometimes being referred to herein as a first and a second signal source, respectively. It should be noted that laser beams and laser beam sensors could be used in lieu of the photocells and light sources if desired in a particular application. Photocells and light sources of the type just described with respect to the photocells 86 and 88 are commercially available and a detailed description of the construction and the operation is not deemed necessary.

A second trailing edge sensor assembly 96 is disposed near the second chute 18. The second trailing edge sensor assembly 96 is spaced a distance 98 (shown only in FIG. 6) in the direction opposite the direction of travel 32 from the trailing edge 40 of the second chute 18 and the second trailing edge sensor assembly 96 also is positioned to detect or sense the trailing end 44 of the railroad cars 12 passing under the second chute 18.

As shown in FIG. 6, the second trailing edge sensor assembly 96 comprises a plurality of spaced apart photocells 100, seven photocells being shown in FIG. 6. The photocells 100 are spaced apart a distance 102 (only one of the distances 102 being designated by a reference numeral in FIG. 6). The photocells 100 are positioned to sense the trailing end 44 of a railroad car at predetermined spaced apart positions.

The photocells 100 are positioned on one side of the railroad track 30 and light sources (not shown) are positioned on the opposite side of the railroad track 30 such that the railroad cars 12 pass between the photocells 100 and the light sources (not shown) as the railroad cars 12 travel along the railroad track 30. More particularly, each of the light sources (not shown) is aligned with one of the photocells 100. The photocells 100 each are constructed to detect or sense light received from the respective one of the light sources (not shown) and each photocell 100 provides an output signal in response to an interruption of the light provided by the respective light source (not shown), the photocells 100 sometimes being referred to herein as signal sources. It should be noted that laser beams and laser beam sensors could be used in lieu of the photocells and light sources, if desired in a particular application. Photocells and light sources of the type just described with respect to the photocells 100 are commercially available and a detailed description of the construction and operation is not deemed necessary.

The system 10 includes a processor 105 (shown in FIG. 7) which can be a commercially available general purpose digital computer. The processor 105 is constructed and adapted to receive the first leading edge sensor assembly 58 first and second output signals provided by the first and the second photocells 62 and 64, respectively, on a signal path 106, the first trailing edge sensor assembly 72 output signals provided by the photocells 76 on a signal path 108, the weighing assembly 50 output signal provided on a signal path 110, the second leading edge sensor assembly 82 first and second output signals provided by the first and the second photocells 86 and 88, respectively, on a signal path 112, and the second trailing edge sensor assembly 96 output signals provided by the photocells 100 on a signal path 114. In response to receiving the signals provided on the signal paths 106, 108, 110, 112 and 114, the processor 105 provides the open and close output signals on a signal path 118 which are received by the first gate actuator 24 and provides the open and close output signals on a signal path 120 which are received by the second gate actuator 26.

In operation, the first leading edge sensor assembly 58 senses or detects the leading end 42 of each of the railroad cars 12 and, in response to sensing the leading end 42, the first leading edge sensor assembly 58 provides an output signal on the signal path 106 (shown in FIG. 7). The processor 105 is programmed to provide an open signal on the signal path 118 to the first gate actuator 24 in response to receiving a signal from the first leading edge sensor assembly 58 indicating the detection of the leading end 42 of every other railroad car 12 or, more particularly, the leading end 42 of each EVEN railroad car 12a.

The first leading edge sensor assembly 58 is positioned with respect to the first chute 16 or, more particularly, the distance (zero in the embodiment shown in the drawings) between the leading edge 34 of the first chute 16 and the first leading edge sensor assembly 58 is sized with respect to the size of a railroad car 12 such that the EVEN railroad car 12a with the leading end 42 detected by the first leading edge sensor assembly 58 is in a position under the first chute 16 for the loading of coal into that EVEN railroad car 12a to be initiated or commenced. The output signal provided by the first leading edge sensor assembly 58 is received by the processor 105 and, in response to receiving a signal on the signal path 106 indicating an EVEN railroad car 12a is in a loading position under the first chute 16, the processor 105 provides the open signal on the signal path 118, which is received by the first gate actuator 24. In response to receiving this open signal on the signal path 118, the first gate actuator 24 causes the first gate 20 to be moved to the opened position allowing coal to be discharged through the first chute 16 and into the EVEN railroad car 12a which is positioned under the first chute 16. As shown in FIG. 1, one EVEN railroad car 12a is positioned under the first chute 16 and the first gate 20 has been moved to the opened position, the arrow in FIG. 1 from the first chute 16 indicating that coal is being discharged from the first chute 16 into the EVEN railroad car 12a thereunder.

The railroad cars 12 continue to move in the direction of travel 32 from the position shown in FIG. 1 and coal continues to be discharged from the first chute 16 into the EVEN railroad car 12a which is positioned beneath or under the first chute 16. While the EVEN railroad car 12a is being filled with coal discharging from the first chute 16, the railroad cars 12 eventually are moved in the direction of travel 32 to a position wherein the ODD railroad car 12b, which is connected to the EVEN railroad car 12a being filled, is positioned with respect to the second chute 18 such that the second leading edge sensor assembly 82 senses or detects the leading end 42 of that ODD railroad car 12b and provides an output signal on the signal path 112 in response to detecting such leading end 42.

The second leading edge sensor assembly 82 is constructed and operates like the first leading edge sensor assembly 58. The second leading edge sensor assembly 82 senses or detects the leading end 42 of each of the railroad cars 12 and, in response to sensing the leading end 42, the second leading edge sensor assembly 82 provides an output signal on the signal path 112. The processor 105 is programmed to provide an open signal on the signal path 120 to the second gate actuator 26 in response to receiving a signal from the second leading edge sensor assembly 82 indicating the detection of the leading end 42 of every other railroad car 12 or, more particularly, the leading end 42 of each ODD railroad car 12b. In operation, the first and the second leading edge sensor assemblies 58 and 82 each sense each leading end 42 of each railroad car 12 and the processor 105 is programmed to alternate between the first and the second leading edge sensor assemblies 58 and 82 so that processor 105 provides the open signal on the signal path 118 in response to receiving a signal from the first leading edge sensor assembly 58 indicating the detection of the leading end 42 of each EVEN railroad car 12a and the processor 105 provides the open signal on the signal path 120 in response to receiving a signal from the second leading edge sensor assembly 82 indicating the detection of the leading end 42 of each ODD railroad car 12b.

The second leading edge sensor assembly 82 is positioned with respect to the second chute 18 or, more particularly, the distance 84 between the leading edge 38 of the second chute 18 and the second leading edge sensor assembly 82 is sized with respect to the size of the railroad cars 12 such that the ODD railroad car 12b with the leading end 42 detected by the second leading edge sensor assembly 82 is in a position under the second chute 18 for the loading of coal into that ODD railroad car 12b to be initiated or commenced. The output signal provided by the second leading edge sensor assembly 82 is received by the processor 105 and, in response to receiving this signal on the signal path 112 indicating a particular ODD railroad car 12b is in a loading position under the second chute 18, the processor 105 provides the open signal on the signal path 120, which is received by the second gate actuator 26. In response to receiving this open signal on the signal path 120, the second gate actuator 26 causes the second gate 22 to be moved to the opened position allowing coal to be discharged through the second chute 18 and into the ODD railroad car 12b which is positioned under the second chute 18. As shown in FIG. 2, one ODD railroad car 12b is positioned under the second chute 18 and the second gate 22 has been moved to the opened position, the arrow in FIG. 2 from the second chute 18 indicating that coal is being discharged from the second chute 18 into the ODD railroad car 12b thereunder. Further, as shown in FIG. 2, coal still is being discharged from the first chute 16 into the EVEN railroad car 12a which is positioned under the first chute 16.

The railroad cars 12 continue to move in the direction of travel 32 from the position shown in FIG. 2 and coal continues to be discharged from the first and the second chutes 16 and 18 into the respective EVEN and ODD railroad cars 12a and 12b which are positioned under the respective chutes 16 and 18. Eventually, the trailing end 44 of the EVEN railroad car 12a being filled from the first chute 16 passes the first trailing edge sensor assembly 72. The first trailing edge sensor assembly 72 detects or senses the trailing end 44 of the EVEN railroad car 12a and provides an output signal on the signal path 108 in response to detecting the trailing end 44 of the EVEN railroad car 12a.

The first trailing edge sensor assembly 72 senses or detects the trailing end 44 of each railroad car 12 and, in response to sensing the trailing end 44, the first trailing edge sensor assembly 72 provides an output signal on the signal path 108. The processor 105 is programmed to provide a close signal on the signal path 118 to the first gate actuator 24 in response to receiving a signal from the first trailing edge sensor assembly 72 indicating the detection of the trailing end 44 of every other railroad car 12 or, more particularly, the trailing end 44 of every EVEN railroad car 12a. The processor 105 can be programmed to provide the close signal on the signal path 118 in response to receiving the first signal from the first trailing edge sensor assembly 72 after receiving the signal from the first leading edge sensor assembly 58 which caused the open signal to be provided on the signal path 118 since this will result in the close signal being provided in response to detecting the trailing end 44 of the proper EVEN railroad car 12a.

The first trailing edge sensor assembly 72 is positioned with respect to the first chute 16 or, more particularly, the distance 74 between the first trailing edge sensor assembly 72 and the trailing edge 36 of the first chute 16 is sized with respect to the size of a railroad car 12 such that the EVEN railroad car 12a with the trailing end 44 detected by the first trailing edge sensor assembly 72 is in a predetermined position under the first chute 16 for terminating that the loading of coal into that EVEN railroad car 12a. More particularly, the first trailing edge sensor assembly 72 is adapted to provide the output signal indicating the detecting of the trailing end 44 at controllingly variable positions of the EVEN railroad car 12a for controlling the weight of the coal discharged into the EVEN railroad car 12a through the first chute 16 so the filled weight more closely approximates the control weight without exceeding the control weight in a manner to be described in greater detail below.

The output signal provided by the first trailing edge sensor assembly 72 is received by the processor 105 and, in response to receiving the signal on the signal path 108 indicating a particular EVEN railroad car 12a is in a predetermined position under the first chute 16, the processor 105 provides the close signal on the signal path 118, which is received by the first gate actuator 24. In response to receiving this close signal on the signal path 118, the first gate actuator 24 causes the first gate 20 to be moved to the closed position thereby preventing coal from being discharged through the first chute 16. As shown in FIG. 3, the first gate 20 has been moved to the closed position and the second gate 22 still is in the opened position permitting coal to be discharged through the second chute 18 and into the ODD railroad car 12b.

As shown in FIG. 3, the EVEN railroad car 12a which was filled by the first chute 16 has been moved a distance in the assembly of travel 32 beyond the position where the trailing end 44 of the EVEN railroad car 12a was detected by the first trailing edge sensor assembly 72. In this position of the EVEN railroad car 12a, the front wheel assembly 49 of the EVEN railroad car 12a is positioned on the railroad track 30 above the weighing assembly 50. In this position, the weighing assembly 50 weighs the load carried by the front wheel assembly 49 of the EVEN railroad car 12a (sometimes referred to as the "EVEN front wheel weight") and the weighing assembly 50 stores the EVEN front wheel weight). The EVEN front wheel weight of the EVEN railroad car 12a alone does not represent the total filled weight of the EVEN railroad car 12a.

The railroad cars 12 continue to move in the direction of travel 32 from the position shown in FIG. 3 to a position wherein the trailing end 44 of the ODD railroad car 12b passes the second trailing edge sensor assembly 96. The second trailing edge sensor assembly 96 detects or senses the trailing end 44 of the ODD railroad car 12b and provides an output signal on the signal path 114 in response to detecting the trailing end 44 of the ODD railroad car 12b.

The second trailing edge sensor assembly 96 is constructed and operates in a manner like the first trailing edge sensor assembly 72. The second trailing edge sensor assembly 96 senses or detects the trailing end 44 of each railroad car 12 and, in response to sensing the trailing end 44, the second trailing edge sensor assembly 96 provides an output signal on the signal path 114. The processor 105 is programmed to provide a close signal on the signal path 120 to the second gate actuator 26 in response to receiving a signal from the second trailing edge sensor assembly 96 indicating the detection of the trailing end 44 of every other railroad car 12 or, more particularly, the trailing end 44 of every ODD railroad car 12b. The processor 105 can be programmed to provide the close signal on the signal path 120 in response to receiving the first signal from the second trailing edge sensor assembly 96 after receiving a signal from the second leading edge sensor assembly 82 which caused the open signal to be provided on the signal path 120 since this will result in the close signal being provided in response to detecting the trailing end 44 of the proper ODD railroad car 12b.

The second trailing edge sensor assembly 96 is positioned with respect to the second chute 18 or, more particularly, the distance 98 between the second trailing edge sensor assembly 96 and the trailing edge 40 of the second chute 18 is sized with respect to the size of a railroad car 12 such that the ODD railroad car 12b with the trailing end 44 detected by the second trailing edge sensor assembly 96 is in a predetermined position under the second chute 18 for terminating the loading of coal into that ODD railroad car 12b. More particularly, the second trailing edge sensor assembly 96 is adapted to provide the output signal indicating the detecting of the trailing end 44 at controllingly variable positions of the ODD railroad car 12b for controlling the weight of the coal discharged into the ODD railroad car 12b through the second chute 18 so the filled weight more closely approximates the control weight without exceeding the control weight, in a manner to be described in greater detail below.

The output signal provided by the second trailing edge sensor assembly 96 is received by the processor 105 and, in response to receiving the signal on the signal path 114 indicating a particular ODD railroad car 12b is in a predetermined position under the second chute 18, the processor 105 provides the close signal on the signal path 120, which is received by the second gate actuator 26. In response to receiving this close signal on the signal path 120, the second gate actuator 26 causes the second gate 18 to be moved to the closed position thereby preventing coal from being discharged through the second chute 18.

The railroad cars 12 continue to move in the direction of travel 32 to a position wherein the rear wheel assembly 51 of the EVEN railroad car 12a are positioned on the railroad track 30 above the weighing assembly 50, as shown in FIG. 4. In this position, the weighing assembly 50 weighs the load carried by the rear wheel assembly 51 of the EVEN railroad car 12a (the weight sometimes being referred to herein as the "EVEN rear wheel weight"), and the EVEN rear wheel weight is stored in the weighing assembly 50. The EVEN rear wheel weight of the EVEN railroad car 12a alone does not represent the total filled weight of the EVEN railroad car 12a. The weighing assembly 50 is constructed to add the stored EVEN front wheel weight to the stored EVEN rear wheel weight and to provide an output signal on the signal path 110 indicative of the sum of the EVEN front wheel weight and the EVEN rear wheel weight. The sum of the EVEN front wheel weight and the EVEN rear wheel weight is the EVEN filled weight of the EVEN railroad car 12a, this being the weight of the EVEN railroad car 12a filled with coal.

The output signal on the signal path 110 indicative of the EVEN filled weight is received by the processor 105. The control weight is stored in the processor 105 and the processor 105 compares the EVEN filled weight with the control weight to determine a differential weight. Based on the determined differential weight, the processor 105 cooperates with the first trailing edge sensor assembly 72 to cause the close signal to be provided on the signal path 118 at controlled, predetermined different positions of the EVEN railroad car 12a with respect to the first trailing edge sensor assembly 72, in a manner to be described in greater detail below.

As shown in FIG. 5, the ODD railroad car 12b which was filled by the second chute 18 has been moved a distance in the direction of travel 32 beyond the position where the trailing end 44 of the ODD railroad car 12b was detected by the second trailing edge sensor assembly 96, the second gate 22 being in the closed position. In this position of the ODD railroad car 12b, the front wheel assembly 49 of the ODD railroad car 12b is positioned on the railroad track 30 above the weighing assembly 50. In this position, the weighing assembly 50 weighs the load carried by the front wheel assembly 49 of the ODD railroad car 12b (this weight sometimes being referred to herein as the "ODD front wheel weight"), and the ODD front wheel weight is stored in the weighing assembly 50. The ODD front wheel weight of the ODD railroad car 12b does not represent the total filled weight of the ODD railroad car 12b.

The railroad cars 12 continue to move in the direction of travel 32 to a position wherein the rear wheel assembly 51 of the ODD railroad car 12b are positioned on the railroad track 30 above the weighing assembly 50 (not shown). In this position, the weighing assembly 50 weighs the load carried by the rear wheel assembly 51 of the ODD railroad car 12a (this weight sometimes being referred to herein as the "ODD rear wheel weight"), and the ODD rear wheel weight is stored in the weighing assembly 50. The ODD rear wheel weight of the ODD railroad car 12b alone does not represent the total filled weight of the ODD railroad car 12b. The weighing assembly 50 is constructed to add the stored ODD front wheel weight to the stored ODD rear wheel weight and to provide an output signal on the signal path 110 indicative of the sum of the ODD front wheel weight and the ODD rear wheel weight. The sum of the ODD front wheel weight and ODD rear wheel weight is the ODD filled weight of the ODD railroad car 12b, this being the weight of the ODD railroad car 12b filled with coal. The output signal on the signal path 110 indicative of the ODD filled weight is received by the Processor 105. The control weight is stored in the processor 105, as mentioned before, and the processor 105 compares the ODD filled weight with the control weight to determine a differential weight. Based on the determined differential weight, the processor 105 cooperates with the second trailing edge sensor assembly 96 to cause the close signal to be provided on the signal path 120 at controlled, predetermined different positions of the ODD railroad car 12b with respect to the second trailing edge sensor assembly 96, in a manner to be described in greater detail below.

The foregoing sequence is repeated until all of the ODD and EVEN railroad cars 12a and 12b have been filled with coal.

Referring more particularly to the construction and operation of the first and the second leading edge sensor assemblies 58 and 82, the first and the second leading edge sensor assemblies 58 and 82 are constructed exactly alike and each includes the first and the second photocell 62 and 64, and 86 and 88, respectively. As shown more clearly in FIG. 6, the leading end 42 of the railroad car 12 traveling in the direction of travel 32 first passes between the first photocell 62 or 86 and the cooperating light source (not shown) which results in a signal being produced on the signal path 106 or 112 indicating the leading end 42 has passed between the first photocell 62 or 86 and the cooperating light source (not shown), this signal being received and stored by the processor 105. As the railroad car 12 continues to travel in the direction of travel 32, the railroad car 12 moves to a position wherein the leading end 42 of the railroad car 12 passes between the second photocell 64 or 88 and the associated light source (not shown) which results in a signal being produced on the signal path 106 or 112 indicating the leading end 42 has passed between the second photocell 64 or 88 and the cooperating light source (not shown), this signal being received and stored by the processor 105. It is the transition of first receiving the signal from the first photocell 62 or 86 and then receiving the signal from the second photocell 64 or 88 which causes the processor 105 to determine that the leading end 42 of a railroad car 12 has been detected by the first or second leading edge sensor assembly 58 or 82 and, in response to this determination, the processor 105 causes the open signal to be produced on the signal path 118 or 120 for moving the first or the second gate 20 or 22 to the opened position permitting coal to be discharged from the first or second chute 16 or 18. If the processor 105 first receives the signal from the second photocell 64 or 88 and then receives the signal from the first photocell 62 or 86, the processor 105 is programmed not to cause the open signal to be provided since this sequence would indicate the railroad cars 12 are moving in a direction generally opposite the direction of travel 32.

When the leading end 42 of the railroad car 12 traveling in the direction of travel 32 passes between the first photocell 62 or 86 and the cooperating light source (not shown), an electronic clock in the processor 105 is actuated and, when the leading end 42 of the railroad car 12 then passes between the second photocell 64 or 88 and the cooperating light source (not shown), the electronic clock is deactivated. The electronic clock in the processor 105 then functions to provide an indication of the time required for the railroad car 12 to move the distance 70 or 94 between the first photocell 62 or 86 and the second photocell 64 or 88. The processor 105 cooperates with the electronic clock to determine the speed of the railroad cars 12 in moving through the distance 70 or 94 in the time indicated by the electronic clock. The processor 105 is constructed not to provide the open signals on either of the output signal paths 118 or 120 which would open the first or second gates 20 or 22, if the processor 105 determines the railroad cars 12 are traveling at a speed below a predetermined minimum speed. In addition, the processor 105 is constructed not to provide the open signals on either of the output signal paths 118 or 120 which would open the first and second gates 20 or 22 if the processor 105 determines the railroad cars 12 are traveling at a speed above a predetermined maximum speed. In one embodiment, it has been determined that the railroad cars 12 should be determined to be traveling at a speed of at least above one-half mile per hour and less than about one and one-half mile per hour before permitting the gates 20 or 22 to open, as a safety measure.

Most railroad cars have ladders supported on the leading and trailing ends such as the ladders 46 and 43 on the railroad cars 12. The photocells 62 and 64 of the first leading edge sensor assembly 58 are separated the distance 70 apart and the photocells 86 and 88 of the second leading edge sensor assembly 82 are separated the distance 94. The distances 70 and 94 are the same and the distances 70 and 94 each are slightly larger than the ladder width 47 plus the distance 48 or the ladder width 53 plus the distance 45, although the distance 70 or 94 is not shown in scale to be larger in the drawings. When the railroad cars 12 are traveling in the direction of travel 32, the ladder 46 initially is interposed between the photocell 62 or 86 and the associated light source (not shown) and, subsequently, the ladder 46 is interposed between the photocell 64 or 88 and the associated light source (not shown). Since the distance 70 or 94 between the photocells 62 or 86 and 64 or 88 is greater than the ladder width 47 or 53 plus the distance 48 or 45, the leading end 42 will be interposed between the photocell 62 or 86 and the associated light source (not shown) before the ladder 46 or 43 is interposed between the photocell 64 or 88 and the associated light source (not shown). As the railroad cars 12 continue to move in the direction of travel 32, eventually the ladder 46 becomes interposed between the photocell 62 or 86 and, at that time and for a brief period of time thereafter, the railroad car 12 and ladder 46 simultaneously are interposed between the photocells 62 or 86 and 64 or 88 and the associated light sources (not shown); however, the railroad car 12 quickly moves further in the direction of travel 32 to a position wherein the ladder 46 no longer is interposed between the photocells 62 or 86 and the associated light source (not shown). As the railroad cars 12 further move in the direction of travel 32, eventually the leading end 42 becomes interposed between the photocells 64 or 88 and the associated light source (not shown) and, at this time, the railroad car 12 is interposed between both photocells 64 or 88 and 62 or 86 and the respective light sources (not shown), this condition remaining true for some period of time as the railroad cars 12 continue to move in the direction of travel. The processor 105 is constructed to provide the open signal on the signal path 106 or 114 only when the railroad car 12 has been interposed between both photocells 64 or 88 and 62 or 86 to assure that the leading end 42 is being detected rather than the ladders 43 and 46.

Referring more particularly to the construction and operation of the first and the second trailing edge sensor assemblies 72 and 96, the first and second trailing edge sensor assemblies 72 and 96 are constructed and operate exactly alike, except one is adapted to sense the trailing end 44 of the EVEN railroad cars 12a and the other is adapted to sense the trailing end 44 of the ODD railroad cars 12b as described before. Initially, the leading end 42 of the railroad car 12 passes between the photocells 76 or 100 and the light source (not shown) and the railroad car 12 is interposed between the photocells 76 or 100 sequentially from left to right as shown in FIG. 6 while the railroad car 12 is moving in the direction of travel 32. This causes a transition in the state of each of the photocells 76 or 100 and the processor 105 does not provide a close signal in response to this transition because this transition indicates the leading end 42 portion of the railroad car 12 is passing between the photocells 76 or 100 and the light source (not shown). As the railroad car 12 continues to move in the direction of travel 32, eventually the trailing end 44 passes one of the photocells 76 or 100 which is disposed the greatest distance from the chute 16 or 18 as compared to the remaining photocells 76 or 100 and the railroad car 12 no longer is disposed between that photocell 76 or 100 and the light source (not shown) which results in a signal being produced on the signal path 108 or 114 indicating the detection of the trailing end 44 by that particular photocell 76 or 100. In a similar manner, the trailing end 44 of the railroad car 12 sequentially passes each of the photocells 76 or 100 from left to right as shown in FIG. 6 and each of the photocells 76 or 100 sequentially provides a signal on the signal path 108 or 114 indicating the detection of the trailing end 44 of the railroad car 12.

It should be noted that the ladder 46 on the front of the railroad car 12 might cause a transition in the photocells 76 or 100 which might indicate the detection of a trailing end 44 resulting in a close signal being produced. However, the processor 105 is programmed to examine the status of the gates 20 and 22 and, in this instance, the gates 20 and 22 already would be closed and the processor 105 does not provide a close signal.

The processor 105 receives each of the signals provided by the photocells 76 or 100 indicating the detection of the trailing end 44 of the railroad car 12. The processor 105 has determined and stored the differential weight of a railroad car 12 previously filled with coal in a manner described before and the processor 105 is programmed to select one of the signals provided by the photocells 76 or 100 to cause the processor 105 to provide the close signal in a manner so more or less coal will be discharged into the railroad car 12 depending on the value of the determined differential weight.

As mentioned before, the photocells 76 or 100 are spaced apart the distance 78 or 102, respectively. The weight of coal being discharged through the chutes 16 or 18 is determined and a rate of travel of the railroad cars 12 passing under the chutes 16 or 18 in the direction of travel 32 is established. Based on this information, the weight of coal discharged through the chutes 16 or 18 while the railroad cars 12 travel the distance 78 or 102 (the spacing between the photocells 76 or 100 is established) such weight sometimes being referred to herein as a "unit weight". Thus, the processor 105 is programmed to select the particular photocell 76 or 100 to cause the close signal based on the differential weight last stored, the unit weight and the particular photocell 76 or 100 previously selected which resulted in a particular railroad car 12 being loaded with coal to a filled weight corresponding to the differential weight last stored.

For example, assume the processor 105 selected the fourth photocell 76 from the left as shown in FIG. 6 to generate the close signal for closing the first gate 20, this would result in one of the EVEN railroad cars 12a to be filled with coal from the first chute 16 until the trailing end 44 of that EVEN railroad car 12a was detected by the fourth photocell 76 from the left as shown in FIG. 6 of the first trailing edge sensor assembly 72 which would result in the processor 105 providing the close signal on the signal path 118 to move the first gate 20 to the closed position. The front and the rear wheel assemblies 49 and 51 then would be weighed sequentially by the weighing assembly 50 and the processor 105 would determine the filled weight and the differential weight for that particular EVEN railroad car 12a in a manner described before. Assuming the differential weight indicated that the particular EVEN railroad car 12a filled with coal weighed less than the control weight by an amount more than one unit weight, but less than two unit weights, then, for the next EVEN railroad car 12a to be filled, the processor 105 would select the fifth photocell 76 from the left as shown in FIG. 6 to cause the close signal to be provided on the signal path 118 resulting in the moving of the first gate 20 to the closed position. In this instance, the next EVEN railroad car 12a would be filled with coal discharging from the first chute 16 for a period of time equal to the time for that EVEN railroad car 12a to travel the distance 78 longer than the time during which the previous EVEN railroad car 12a was filled with coal discharging from the first chute 16. In other words, the next EVEN railroad car 12a would be filled with an additional amount of coal weighing about one unit weight. Based on the determined differential weight of each EVEN railroad car 12a, the amount of coal loaded into the next EVEN railroad car 12a controllingly is adjusted by selecting the particular photocell 76 to cause the close signal to be provided on the signal path 118.

The second trailing edge sensor assembly 96 will operate in a manner like that described before with respect to the first trailing edge sensor assembly 72. For example, assume the processor 105 selected the fifth photocell 100 from the left as shown in FIG. 6 to generate the close signal for closing the second gate 22, this would result in one of the ODD railroad cars 12b to be filled with coal from the second chute 18 until the trailing end 44 of that ODD railroad car 12b was detected by the fifth photocell 100 from the left as shown in FIG. 6 of the second trailing edge sensor assembly 96 which would result in the processor 105 providing the close signal on the signal path 120 to move the second gate 22 to the closed position. The front and the rear wheel assemblies 49 and 51 then would be weighed sequentially by the weighing assembly 50 and the processor 105 would determine the filled weight and the differential weight for that particular ODD railroad car 12b in a manner described before. Assuming the differential weight indicated that the particular ODD railroad car 12b filled with coal weighed more than the one unit weight, but less than two unit weights, then, for the next ODD railroad car 12b to be filled, the processor 105 would select the fourth photocell 100 from the left as shown in FIG. 6 to cause the close signal to be provided on the signal path 120 resulting in the moving of the second gate 22 to the closed position. In this instance, the next ODD railroad car 12b would be filled with coal discharging from the second chute 18 for a period of time equal to the time for that ODD railroad car 12b to travel the distance 102 less than the time during which the pervious ODD railroad car 12b was filled with coal discharging from the second chute 18. In other words, the next ODD railroad car 12b would be filled with less coal by an amount of coal weighing about one unit weight. Based on the determined differential weight of each ODD railroad car 12b, the amount of coal loaded into the next ODD railroad car 12b controllingly is adjusted by selecting the particular photocell 100 to cause the close signal to be provided on the signal path 120.

It should be noted that, in one form, the weighing assembly 50 could be constructed to provide one output signal on the signal path 110 indicative of the ODD or EVEN front wheel weight and another output signal on the signal path 110 indicative of the ODD or EVEN real wheel weight. In this form, the processor 105 would be constructed to receive the signals, store the indicated weights and sum the weights to obtain respective ODD or EVEN filled weight.

Also, it should be noted that, in one form, the system of the present invention could be constructed such that the weighing assembly 50 comprised two weighing assemblies or scales. In this system, one of the scales would be positioned to weigh the front and rear wheel assemblies of the ODD railroad cars and the other scale would be positioned to weigh the front and rear wheel assemblies of the EVEN railroad cars. One of the main disadvantages of this last mentioned system would be the cost and upkeep expenses incurred for the additional scale.

It should be noted that, in one other form, the system of the present invention could be utilized to adjust the weight of every other railroad car or could be utilized with a single chute, rather than two chutes, as shown in the drawings. Also, the present invention could be constructed such that the two chutes are utilized to load each railroad car, with one chute being utilized to partially load the railroad car and the second chute being utilized to complete the loading of the railroad car.

Finally, it should be noted that the processor 105 could be constructed to activate an electronic clock each time the trailing end 44 of a railroad car 12 passes between one of the photocells 76 or 100 and the corresponding light source (not shown), the electronic clock being deactivated when the trailing end 44 passes between the next photocell 76 or 100 and the corresponding light source (not shown). Since the distance 78 or 102 between the photocells 76 or 100 is known, the electronic clock provides a means for determining the speed of the railroad cars 12. Once the speed of the railroad cars 12 has been determined, the processor 105 can be programmed to provide the close signal on the appropriate signal path to close the gate 20 or 22 at some predetermined distance between the next two photocells 76 or 100 to be passed by the trailing end 44.

In one model, the average speed of the railroad cars 12 moving under the chutes 16 and 18 was determined to be one (1) mile per hour; the control weight was established to be 263,000 pounds; the spacings between the first and the second photocells 70 and 94 each were determined to be about twelve (12) inches; the ladder widths 47 and 53 plus the respective distances 48 and 45 were determined to be four (4) inches; the distances 74 and 98 each were determined to be about twelve (12) feet (this distance represents the latest you can close the gates 20 or 22 and would vary depending on the chute construction); the first and the second trailing edge sensor assemblies 72 and 96 each included twelve (12) photocells spaced apart by distances 78 and 102, respectively, which were determined to be six (6) inches; a unit weight of three thousand (3000) pounds was established; and each determined differential weight was multiplied by a correction factor of seventy percent (70%) before determining the particular photocell 76 or 100 to be used as detecting the trailing end 44 of the next respective EVEN or ODD railroad car 12a or 12b to assure the railroad cars 12 were not filled to a weight exceeding the established control weight. Using the prior visual, operator controlled method for loading railroad cars, a standard deviation of 5200 pounds was determined for the railroad cars filled with coal. Utilizing the method of the present invention and the parameters mentioned above with respect to the one model, the standard deviation was reduced to 2,600 pounds which represent a substantial savings.

Changes may be made in the steps or in the sequence of the steps of the method described herein, and changes may be made in the construction and operation of the parts or elements or assemblies described herein without departing from the spirit and the scope of the invention as defined in the following claims.

What is claimed is:

1. A method for loading particles into a plurality of railroad cars wherein a control weight of a railroad car loaded with particles is established and wherein the particles are discharged through a first and a second chute and wherein a first gate is disposed in the first chute having an opened position and a closed position, the particles being dischargeable through the first chute in the opened position of the first gate and the particles being blocked in the first chute by the first gate in the closed position of the first gate, and wherein a second gate is disposed in the second chute having an opened position and a closed position, the particles being dischargeable through the second chute in the opened position of the second gate and the particles being blocked in the second chute by the second gate in the closed position of the second gate, the railroad cars moving under the first and the second chutes in a direction of travel, and every other railroad car being designated an EVEN railroad car and the remaining every other railroad cars being designated an ODD railroad car, comprising the steps of:

loading particles from the first chute into the EVEN railroad cars;

loading particles from the second chute into the ODD railroad cars;

weighing each EVEN railroad car loaded with particles from the first chute to determine a filled weight of that EVEN railroad car;

comparing the filled weight of each EVEN railroad car with the control weight to determine a differential weight;

adjusting the loading of particles from the first chute to vary the weight of the particles loaded into the next EVEN railroad car to be loaded from the first chute so the filled weight of the next EVEN railroad car to be loaded with particles from the first chute more nearly approximates the control weight;

weighing each ODD railroad car loaded with particles from the second chute to determine a filled weight of that ODD railroad car;

comparing the filled weight of each ODD railroad car with the control weight to determine a differential weight; and adjusting the loading of particles from the second chute to vary the weight of the particles loaded into the next ODD railroad car from the second chute so the filled weight of the next ODD railroad car to be loaded with particles from the second chute more nearly approximates the control weight.

2. The method of claim 1 wherein the step of adjusting the loading of particles from the first chute is defined further as adjusting the loading of particles from the first chute so the filled weight of the next EVEN railroad car to be filled with particles from the first chute more nearly approximates and is less than the control weight; and wherein the step of adjusting the loading particles from the second chute is defined further as adjusting the loading of particles from the second chute so the filled weight of the next ODD railroad car to be filled with particles from the second chute more nearly approximates and is less than the control weight.

3. The method of claim 1 wherein each railroad car is defined further as having a leading end and a trailing end, and wherein the step of loading particles from the first chute is defined further to include the steps of:

sensing the leading end of each EVEN railroad car at a predetermined position with respect to the first chute; and opening the first gate in response to sensing the leading end of each EVEN railroad car for discharging particles from the first chute; and wherein the step of loading particles from the second chute is defined further to include the steps of:

sensing the leading end of each ODD railroad car at a predetermined position with respect to the second chute; and opening the second gate in response to sensing the leading end of each ODD railroad car for discharging particles from the second chute.

4. The method of claim 1 wherein each railroad car is defined further as having a leading end and a trailing end and wherein the step of loading particles from the first chute is defined further to include the steps of:

sensing the trailing end of each EVEN railroad car at a predetermined position with respect to the first chute; and closing the first gate in response to sensing the trailing end of an EVEN railroad car for terminating the discharge of particles from the first chute; and wherein the step of loading particles from the second chute is defined further to include the step of:

sensing the trailing end of each ODD railroad car at a predetermined position with respect to the second chute; and closing the second gate in response to sensing the trailing end of an ODD railroad car for terminating the discharge particles from the second chute.

5. The method of claim 1 wherein each railroad car includes a front wheel assembly and a rear wheel assembly, and wherein the step of weighing each EVEN railroad car is defined further to include the steps of:

weighing the front wheel assembly of each EVEN railroad car loaded with particles from the first chute to determine an EVEN front wheel weight;

weighing the rear wheel assembly of each EVEN railroad car loaded with particles from the first chute to determine an EVEN rear wheel weight; and adding the EVEN front wheel weight to the EVEN rear wheel weight to determine the filled weight of each EVEN railroad car; and wherein the step of weighing each ODD railroad car is defined further to include the steps of:

weighing the front wheel assembly of each ODD railroad car loaded with particles from the second chute to determine an ODD front wheel weight;

weighing the rear wheel assembly of each ODD railroad car loaded with particles from the second chute to determine an ODD rear wheel weight; and adding the ODD front wheel weight to the ODD rear wheel weight to determine the filled weight of each ODD railroad car.

6. A method for loading particles into a plurality of railroad cars wherein a control weight of a railroad car loaded with particles is established and wherein the particles are discharged through a chute and wherein a gate is disposed in the chute having an opened position and a closed position, the particles being dischargeable through the chute in the opened position of the gate and the particles being blocked in the chute by the gate in the closed position of the gate, the railroad cars moving under the chute in a direction of travel, and every other railroad car being designated an EVEN railroad car, comprising the steps of:

loading particles from the chute into the railroad cars;

weighing each EVEN railroad car loaded with particles to determine a filled weight of that EVEN railroad car;

comparing the filled weight of each EVEN railroad car with the control weight to determine a differential weight; and adjusting the loading of particles from the chute to vary the weight of the particles loaded into the next railroad cars to be loaded from the chute so the filled weight of the next EVEN railroad car to be loaded with particles from the chute more nearly approximates the control weight.

7. The method of claim 6 wherein the steps of adjusting the loading of particles from the chute is defined further as adjusting the loading of particles from the chute so the filled weight of the next railroad cars to be filled with particles from the chute more nearly approximates and is less than the control weight.

8. The method of claim 6 wherein each railroad car is defined further as having a leading end and a trailing end, and wherein the step of loading particles from the chute is defined further to include the steps of:

sensing the leading end of each railroad car at a predetermined position with respect to the chute; and opening the gate in response to sensing the leading end of each railroad car for discharging particles from the chute.

9. The method of claim 6 wherein each railroad car is defined further as having a leading end and a trailing end, and wherein the step of loading particles from the chute is defined further to include the steps of:

sensing the trailing end of each railroad car at a predetermined position with respect to the chute; and closing the gate in response to sensing the trailing end of a railroad car for terminating the discharge of particles from the chute.

10. The method of claim 6 wherein each railroad car includes a front wheel assembly and a rear wheel assembly, and wherein the stop of weighing each EVEN railroad car is defined further to include the steps of:

weighing the front wheel assembly of each EVEN railroad car loaded with particles from the chute to determine an EVEN front wheel weight;

weighing the rear wheel assembly of each EVEN railroad car loaded with particles from the chute to determine an EVEN rear wheel weight; and adding the EVEN front wheel weight to the EVEN rear wheel weight to determine the filled weight of each EVEN railroad car.

11. A method for loading particles into a plurality of railroad cars wherein a control weight of a railroad car loaded with particles is established and wherein the particles are discharged through a chute and wherein a gate is disposed in the chute having an opened position and a closed position, the particles being dischargeable through the first chute in the opened position of the gate and the particles being blocked in the chute by the gate in the closed position of the gate, and wherein each railroad car has a leading end and a trailing end, the railroad cars moving under the chute in a direction of travel comprising the steps of:

loading particles from the chute into the railroad cars;

weighing each railroad car loaded with particles from the chute to determine a filled weight of each railroad car;

comparing the filled weight of each railroad car with the control weight to determine a differential weight; and adjusting the loading of particles from the chute to vary the weight of the particles loaded into the next railroad car to be loaded from the chute so the filled weight of the next railroad car to be loaded with particles from the chute more nearly approximates the control weight.

12. The method of claim 11 wherein the step of adjusting the loading of particles from the chute is defined further as adjusting the loading of particles from the chute so the filled weight of the next railroad car to be filled with particles from the chute more nearly approximates and is less than the control weight.

13. The method of claim 1 wherein the step of loading particles from the chute is defined further to include the steps of:

sensing the leading end of each railroad car at a predetermined position with respect to the chute; and opening the gate in response to sensing the leading end of each railroad car for discharging particles from the chute.

14. The method of claim 13 wherein the step of loading particles from the chute is defined further to include the steps of:

sensing the trailing end of each railroad car at a predetermined position with respect to the chute; and closing the gate in response to sensing the trailing end of a railroad car for terminating the discharge of particles from the chute.

15. The system of claim 11 wherein each railroad car includes a front wheel assembly and a rear wheel assembly, and wherein each step of weighing each railroad car is defined further to include the steps of:

weighing the front wheel assembly of each railroad car loaded with particles from the chute to determine a front wheel weight;

weighing the rear wheel assembly of each railroad car loaded with particles from the chute to determine rear wheel weight; and adding the front wheel weight to the rear wheel weight to determine the filled weight of each railroad car.

16. A method for loading particles into a plurality of railroad cars wherein a control weight of a railroad car loaded with particles is established and wherein particles are discharged through a first and a second chute and wherein a first gate is disposed in the first chute having an opened position and a closed position, the particles being dischargeable through the first chute in the opened position of the first gate and the particles being blocked in the first chute by the first gate in the closed position of the first gate, and wherein a second gate is disposed in the second chute having an opened position and a closed position, the particles being dischargeable through the second chute in the opened position of the second gate and the particles being blocked in the second chute by the second gate in the closed position of the second gate, the railroad cars each having a leading end and a trailing end and each moving under the first and the second chutes in a direction of travel, and every other railroad car being designated as an EVEN railroad car and the remaining every other railroad car being designated as an ODD railroad car, comprising the steps of:

loading the particles from the first chute into the EVEN railroad cars, comprising the steps of:

sensing the leading end of each EVEN railroad car at a predetermined position with respect to the first chute, comprising the steps of:

sensing the leading end of each railroad car at a first predetermined position with respect to the first chute; and sensing the leading end of each EVEN railroad car at a second predetermined position with respect to the first chute and spaced a distance in the direction of travel from the first predetermined position; and opening the first gate in response to sensing the leading end of each EVEN railroad car for discharging particles from the first chute in response to sensing the leading end of an EVEN railroad car at the second position after sensing the leading end of each such EVEN railroad car at the first position; and loading the particles from the second chute into the ODD railroad cars, comprising the steps of:

sensing the leading end of each ODD railroad car at a predetermined position with respect to the second chute, comprising the steps of:

sensing the leading end of each ODD railroad car at a first predetermined position with respect to the second chute; and sensing the leading end of each ODD railroad car at a second predetermined position with respect to the second chute spaced a distance in the direction of travel from the first predetermined position; and opening the second gate in response to sensing the leading end of an ODD railroad car at the second predetermined position after sensing the leading end of such ODD railroad car at the first predetermined position;

weighing each EVEN railroad car loaded with particles from the first chute to determine a filled weight of that EVEN railroad car;

comparing the filled weight of each EVEN railroad car with the control weight to determine a differential weight;

adjusting the loading of particles from the first chute to vary the weight of the particles loaded into the next EVEN railroad car to be loaded from the first chute so the filled weight of the next EVEN railroad car to be loaded with particles from the first chute more nearly approximates the control weight;

weighing each ODD railroad car loaded with particles from the second chute to determine a filled weight of that ODD railroad car;

comparing the filled weight of each ODD railroad car with the control weight to determine a differential weight; and adjusting the loading of particles from the second chute to vary the weight of the particles loaded into the next ODD railroad car from the second chute so the filled weight of the next ODD railroad car to be loaded with particles from the second chute more nearly approximates the control weight.

17. The method of claim 16 wherein some of the railroad cars include a ladder, having a ladder width, which is connected to the leading end of such railroad cars, the ladder being disposed a distance from the leading end of the railroad cars, and wherein the step of sensing the leading end of each EVEN railroad car at the second predetermined position is defined further as sensing the leading end of each EVEN railroad car at the second predetermined position space a distance from the first predetermined position which distance is greater than the ladder width plus the distance of the ladder from the leading end of the railroad car, and wherein the step of sensing the leading end of each ODD railroad car at the second predetermined position is defined further as sensing the leading end of each ODD railroad car at the second position spaced a distance from the first predetermined position which distance is greater than the ladder width plus the distance of the ladder from the leading end of the railroad car.

18. A method for loading particles into a plurality of railroad cars wherein a control weight of a railroad car loaded with particles is established and wherein particles are discharged through a first and a second chute and wherein a first gate is disposed in the first chute having an opened position and a closed position, the particles being dischargeable through the first chute in the opened position of the first gate and the particles being blocked in the first chute by the first gate in the closed position of the first gate, and wherein a second gate is disposed in the second chute having an opened position and a closed position, the particles being dischargeable through the second chute in the opened position of the second gate and the particles being blocked in the second chute by the second gate in the closed position of the second gate, the railroad cars each having a leading end and a trailing end and each moving under the first and the second chutes in a direction of travel, and every other railroad car being designated as an EVEN railroad car and the remaining every other railroad car being designated as an ODD railroad car, comprising the steps of:
  loading particles from the first chute into the EVEN railroad cars, comprising the steps of:
    sensing the trailing end of each EVEN railroad car at a plurality of predetermined spaced apart positions with respect to the first chute; and
    closing the first gate in response to sensing the trailing end of an EVEN railroad car for terminating the discharge of particles from the first chute; and
  loading particles from the second chute into the ODD railroad cars, comprising the steps of:
    sensing the trailing end of each ODD railroad car at a plurality of predetermined spaced apart positions with respect to the second chute; and
    closing the second gate in response to sensing the trailing end of an ODD railroad car for terminating the discharge of particles from the second chute;
  weighing each EVEN railroad car loaded with particles from the first chute to determine a filled weight of that EVEN railroad car;
  comparing the filled weight of each EVEN railroad car with the control weight to determine a differential weight;
  adjusting the loading of particles from the first chute to vary the weight of the particles loaded into the next EVEN railroad car to be loaded from the first chute so the filled weight of the next EVEN railroad car to be loaded with particles from the first chute more nearly approximates the control weight, comprising the steps of:
    selecting one of the predetermined spaced apart positions in response to the determined differential weight for varying the weight of the particles loaded into the next EVEN railroad car so the filled weight of the next EVEN railroad car to be loaded with particles from the first chute more nearly approximates the control weight, the step of closing the first gate being defined further as closing the first gate in response to sensing the trailing end of an EVEN railroad car at the selected predetermined position for terminating the discharge of particles from the first chute;
  weighing each ODD railroad car loaded with particles from the second chute to determine a filled weight of that ODD railroad car; and
  comparing the filled weight of each ODD railroad car with the control weight to determine a differential weight; and
  adjusting the loading of particles from the second chute to vary the weight of the particles loaded into the next ODD railroad car from the second chute so the filled weight of the next ODD railroad car to be loaded with particles from the second chute more nearly approximates the control weight, comprising the steps of:
    selecting one of the predetermined spaced apart positions in response to the determined differential weight for varying the weight of the particles loaded into the next ODD railroad car so the filled weight of the next ODD railroad car to be loaded with particles from the second chute more nearly approximates the control weight, the step of closing the second gate being defined further as closing the second gate in response to sensing the trailing end of an ODD railroad car at the selected predetermined position for terminating the discharge of particles from the second chute.

19. The method of claim 18 defined further to include the step of:
  establishing a unit weight value to the spacing between the predetermined spacing apart positions for sensing the trailing end of each EVEN railroad car; and
wherein the step of selecting one of the predetermined spaced apart positions for sensing the trailing end of the EVEN railroad cars is defined further as selecting one of the predetermined spaced apart positions spaced from the last selected predetermined position distances having a total unit weight value approximately equal to the determined differential weight, and wherein the system is defined further to include the step of:
  establishing a unit weight value to the spacing between the predetermined spaced apart positions for sensing the trailing end of each ODD railroad car; and
wherein the step of selecting one of the predetermined spaced apart positions for sensing the trailing end of the ODD railroad cars is defined further as selecting one of the predetermined spaced apart positions spaced from the last selected predetermined position distances having a total unit weight value approximately equal to the determined differential weight.

20. A method for loading particles into a plurality of railroad cars wherein a control weight of a railroad car loaded with particles is established and wherein the particles are discharged through a chute and wherein a gate is disposed in the chute having an opened position and a closed position, the particles being dischargeable through the chute in the opened postion of the gate and the particles being blocked in the chute by the gate in the closed position of the gate, each of the railroad cars having a leading end and a trailing end and each of the railroad cars moving under the chute in a direction of travel, and every other railroad car being designated an EVEN railroad car, comprising the steps of:
  loading particles from the chute into the railroad cars, comprising the steps of:
    sensing the leading end of each railroad car at a predetermined position with respect to the chute, comprising the steps of:
      sensing the leading end of each railroad car at a first predetermined position with respect to the chute; and
      sensing the leading end of each railroad car at a second predetermined position with respect to the chute and spaced a distance in the direction of travel from the first predetermined position; and
    opening the gate in response to sensing the leading end of each railroad car at the second predetermined position after first sensing the leading end of each railroad car at the first predetermined position;
  weighing each EVEN railroad car loaded with particles to determine a filled weight of that EVEN railroad car;
  comparing the filled weight of each EVEN railroad car with the control weight to determine a differential weight; and
  adjusting the loading of particles from the chute to vary the weight of the particles loaded into the next railroad cars to be loaded from the chute so the filled weight of the next EVEN railroad car to be loaded with particles from the chute more nearly approximates the control weight.

21. The method of claim 20 wherein railroad cars include a ladder, having a ladder width, which is connected to the leading end of such railroad cars, the ladder being spaced a distance from the leading end of the railroad cars, and wherein the step of sensing the leading end of each railroad car at the second predetermined position is defined further as sensing the leading end of each railroad car at the second predetermined position spaced a distance from the first predetermined position which distance is greater than the ladder width plus the distance of the ladder from the leading end of the railroad cars.

22. A method for loading particles into a plurality of railroad cars wherein a control weight of a railroad car loaded with particles is established and wherein the particles are discharged through a chute and wherein a gate is disposed in the chute having an opened position and a closed position, the particles being dischargeable through the chute in the opened position of the gate and the particles being blocked in the chute by the gate in the closed position of the gate, each of the railroad cars having a leading end and a trailing end and each of the railroad cars moving under the chute in a direction of travel, and every other rialroad car being designated an EVEN railroad car, comprising the steps of:

loading particles from the chute into the railroad cars, comprising the steps of:
sensing the trailing end of each railroad car at a plurality of spaced apart positions with respect to the chute; and
closing the gate in response to sensing the trailing end of a railroad car for terminating the discharge of particles from the chute;
weighing each EVEN railroad car loaded with particles to determine a filled wieght of that EVEN railroad car;
comparing the filled weight of each EVEN railroad car with the control weight to determine a differential weight; and
adjusting the loading of particles from the chute to vary the weight of the particles loaded into the next railroad cars to be loaded from the chute so the filled weight of the next EVEN railroad car to be loaded with particles from the chute more nearly approximates the control weight, comprising the steps of:
selecting one of the predetermined spaced apart positions in response to the determined differential weight for varying the weight of the particles loaded into the next railroad car so the filled weight of the next railroad car to be loaded with particles from the chute more nearly approximates the control weight, the step of closing the gate being defined further as closing the gate in response to sensing the trailing end of a railroad car at the selected predetermined position for terminating the discharge of particles from the chute.

23. The method of claim 22 defined further to include the step of:
establishing a unit weight value to the spacing between the predetermined spaced apart positions for sensing the trailing end of each railroad car; and
wherein the step of selecting one of the predetermined spaced apart positions for sensing the trailing end of the railroad cars is defined further as selecting one of the predetermined spaced apart positions spaced from the last selected predetermined position distances having a total unit weight value approximately equal to the determined differential weight.

24. A method for loading particles into a plurality of railroad cars wherein a control weight of the railroad car loaded with particles is established and wherein the particles are discharged through a chute and wherein a gate is disposed in the chute having an opened position and a closed position, the particles being dischargeable through the chute in the opened position of the gate and the particles being blocked in the chute by the gate in the closed position of the gate, and wherein each railroad car has a leading end and a trailing end, the railroad cars moving under the chutes in a direction of travel comprising the steps of:

loading particles from the chute into the railroad cars, comprising the steps of:
sensing the leading end of each railroad car at a predetermined position with respect to the chute, comprising the steps of:
sensing the leading end of each railroad car at a first predetermined position with respect to the first chute; and
sensing the leading end of each railroad car at a second predetermined position with respect to the chute and spaced a distance in the direction of travel from the first predetermined position;
opening the gate in response to sensing the leading end of each railroad car for discharging particles from the chute in response to sensing the leading end of a railroad car at the second predetermined position after first sensing the leading end of such railroad car at the first predetermined position;
weighing each railroad car loaded with particles from the chute to determine a filled weight of each railroad car;
comparing the filled weight of each railroad car with the control weight to determine a differential weight; and
adjusting the loading of particles from the chute to vary the weight of the particles loaded into the next railroad car to be loaded from the chute so the filled weight of the next railroad car to be loaded with particles from the chute more nearly approximates the control weight.

25. The method of claim 24 wherein some of the railroad cars include a ladder, having a ladder width, which is connected to the leading end of such railroad cars, the ladder being spaced a distance from the leading end of the railroad cars, and wherein the step of sensing the leading end of each railroad car at the second predetermined position is defined further as sensing the leading end of each railroad car at the second predetermined position spaced a distance from the first predetermined position which distance is greater than the ladder width plus the distance of the ladder from the leading end of the railroad cars.

26. A method for loading particles into a plurality of railroad cars wherein a control weight of a railroad car loaded with particles is established and wherein the particles are discharged through a chute and wherein a gate is disposed in the chute having an opened position and a closed position, the particles being dischargeable through the chute in the opened position of the gate and the particles being blocked in the chute by the gate in the closed position of the gate, and wherein each railroad car has a leading end and a trailing end, the railroad cars moving under the chutes in a direction of travel comprising the steps of:

loading particles from the chute into the railroad cars, comprising the steps of:

sensing the leading end of each railroad car at a predetermined position with respect to the chute, comprising the steps of:

sensing the trailing end of each railroad car at a plurality of predetermined spaced apart positions with respect to the chute; and closing the gate in response to sensing the trailing end of a railroad car for terminating the discharge of particles from the chute;

opening the gate in response to sensing the leading end of each railroad car for discharging particles from the chute;

weighing each railroad car loaded with particles from the chute to determine a filled weight of each railroad car;

comparing the filled weight of each railroad car with the control weight to determine a differential weight; and adjusting the loading of particles from the chute to vary the weight of the particles loaded into the next railroad cars to be loaded from the chute so the filled weight of the next railroad car to be loaded with particles from the chute more nearly approximates the control weight, comprising the steps of:

selecting one of the predetermined spaced apart positions in response to the determined differential weight for varying the weight of the particles loaded into the next railroad car so the filled weight of the next railroad car to be loaded with particles from the chute more nearly approximates the control weight, the step of closing the gate being defined further as closing the gate in response to sensing the trailing end of a railroad car at the selected predetermined position for terminating the discharge of particles from the chute.

27. The method of claim 26 defined further to include the step of:

establishing a unit weight value to the spacing between the predetermined spaced apart positions for sensing the trailing end of each railroad car; and wherein the step of selecting one of the predetermined spaced apart positions for sensing the trailing end of the railroad cars is defined further as selecting one of the predetermined spaced apart positions spaced from the last selected predetermined position distances having a total unit weight value approximately equal to the determined differential weight.

* * * * *

UNITED STATES PATENT AND TRADEMARK OFFICE
Certificate

Patent No. 4,460,308                                              Patented July 17, 1984

Jack L. Moon and John C. Tompkins

Application having been made by Jack L. Moon and John C. Tompkins, the inventors named in the patent above identified, and Kerr-McGee Coal Corp. the assignee, for the issuance of a certificate under the provisions of Title 35, Section 256, of the United States Code, adding the names of John A. L. Campbell and Larry S. Trowsdale as joint inventors, and a showing and proof of facts satisfying the requirements of the said section having been submitted, it is this 2nd day of Apr., 1985, certified that the names of the said John A. L. Campbell and Larry S. Trowsdale are hereby added to the said patent as joint inventors with the said Jack L. Moon and John C. Tompkins.

Fred W. Sherling,
*Associate Solicitor.*